United States Patent [19]

Townsend

[11] 4,005,730
[45] Feb. 1, 1977

[54] BRAKE MEANS FOR AN AIR-POWERED SPRINKLER SYSTEM

[76] Inventor: Loren R. Townsend, Sidney, Nebr. 69162

[22] Filed: Feb. 11, 1976

[21] Appl. No.: 657,284

Related U.S. Application Data

[63] Continuation-in-part of Ser. No. 540,114, Jan. 10, 1975, Pat. No. 3,952,768.

[52] U.S. Cl. .............................. 137/344; 188/292; 239/177
[51] Int. Cl.² .......................................... B05B 3/12
[58] Field of Search ........... 239/177, 212; 137/344; 188/290, 292, 293

[56] References Cited

UNITED STATES PATENTS

| | | | |
|---|---|---|---|
| 2,007,279 | 7/1935 | McCleary | 188/292 |
| 2,723,010 | 11/1955 | Stelmack | 188/292 X |
| 2,763,974 | 9/1956 | Martin | 188/292 X |
| 3,606,161 | 9/1971 | Paul | 137/344 X |
| 3,766,937 | 10/1973 | Lundvall et al. | 239/212 X |

*Primary Examiner*—Evon C. Blunk
*Assistant Examiner*—Michael Mar
*Attorney, Agent, or Firm*—Zarley, McKee, Thomte & Voorhees

[57] ABSTRACT

A brake for a fluid-powered sprinkler system is provided for preventing the drive towers from rolling down inclines and for preventing the wind from rolling the drive towers. The fluid power may either be compressed air or water under pressure. An overhead water supply pipe extends outwardly from the center pivot point and is supported by a plurality of spaced-apart wheeled drive towers. In the preferred embodiment, an air-powered drive is provided on each of the towers to propel the towers and water supply pipe around the center pivot point. A control is provided on each of the towers for selectively operating the drive associated therewith to maintain the pipe and towers in an aligned condition as the water supply pipe is pivoted around the central pivot point. The control comprises a rotary cam plate having an alignment rod secured thereto which extends to the gimbal ring on a flexible joint positioned on the water supply pipe adjacent the tower. The rotary cam plate controls the operation of a fluid cylinder which is pivotally connected to a trojan bar mounted on the drive tower for reciprocating movement. The trojan bar is provided with downwardly extending dogs on its opposite ends which engage the drive wheels to rotate the same on actuation of the fluid cylinder. A pump is mounted on at least one of the towers adjacent one of the drive towers and has a rotatable shaft extending therefrom. A brake member is mounted on the pump shaft and is in operative engagement with the drive lugs extending from the drive wheels so that the brake member will be rotated by the drive lugs as the wheel is rotated. The pump has a fluid circuit which normally prevents rotation of the brake member thereby preventing rotation of the wheel. A brake release apparatus is operatively connected to the pump and to a lug actuated switch on the trojan bar to permit the pump to freely rotate when the switch is in engagement with one of the drive lugs when the trojan bar moves in one direction. If the tower moves faster than intended during the drive stroke, the pump prevents rotation of the brake member. The pump also prevents rotation of the brake member during the return stroke of the trojan bar.

4 Claims, 6 Drawing Figures

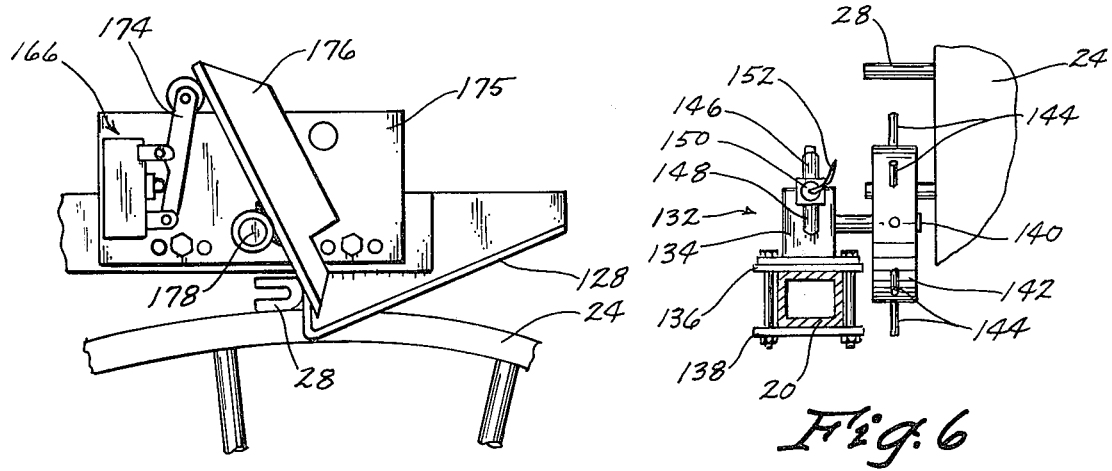
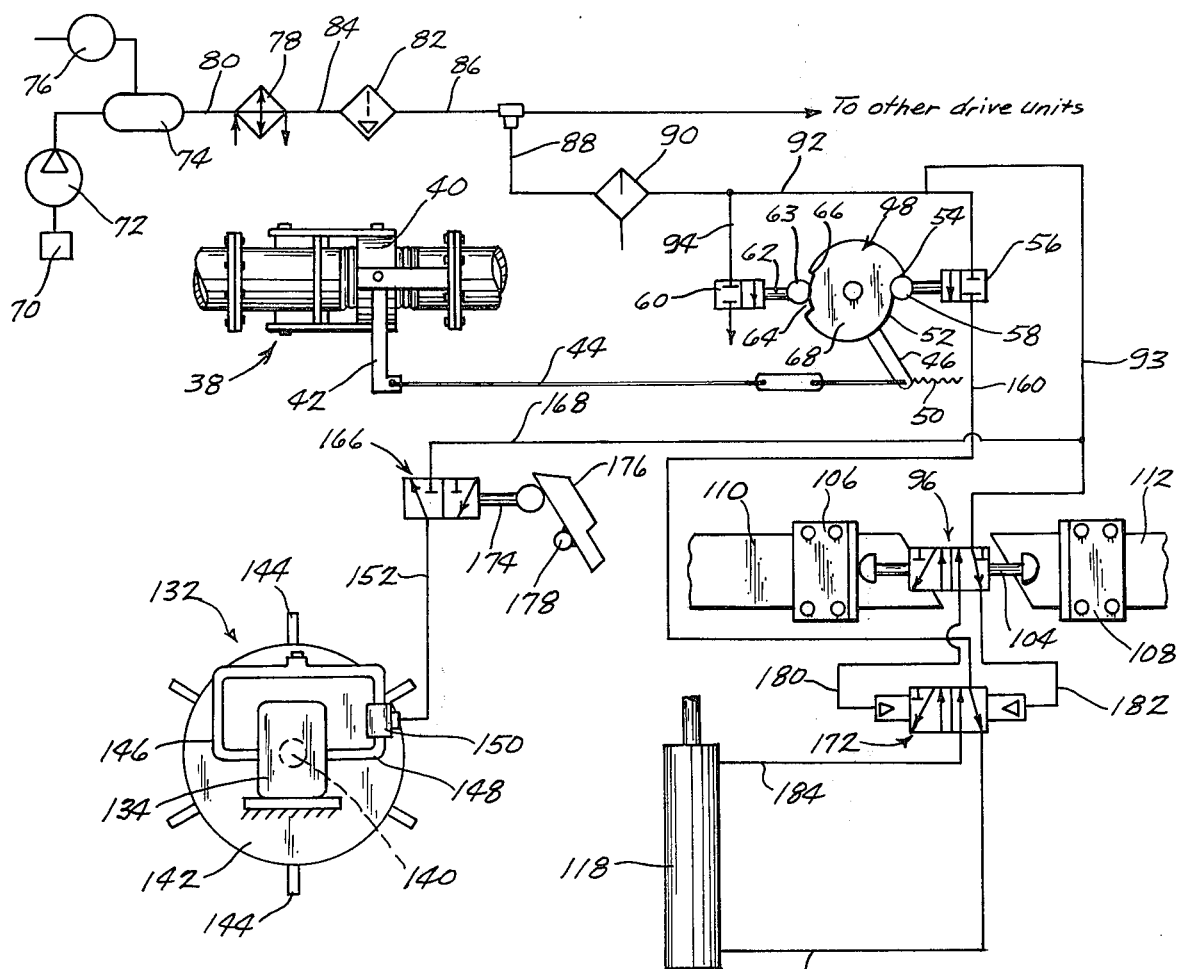
Fig. 4
Fig. 6
Fig. 5

4,005,730

BRAKE MEANS FOR AN AIR-POWERED SPRINKLER SYSTEM

This is a continuation-in-part application of Ser. No 540,114 filed Jan. 10, 1975 now U.S. Pat. No. 3,952,768.

BACKGROUND OF THE INVENTION

This invention relates to a fluid-powered sprinkler system and more particularly to a brake means for a fluid-powered sprinkler system of the water or air powered type.

Air-powered sprinkler systems such as those disclosed in U.S. Pat. No. 3,606,161 are employed to irrigate large areas of land around a center pivot. A plurality of drive towers are provided along the length of the overhead water supply pipe to propel the supply pipe around the center pivot.

In an air-powered sprinkler system such as that disclosed in U.S. Pat. No. 3,606,161, and the system disclosed in the patent application filed Jan. 10, 1975, Ser. No. 540,112 entitled AN AIR-POWERED SPRINKLER SYSTEM now U.S. Pat. No. 3,916,942, a problem arises in that the towers tend to roll down steep inclines thereby becoming out of alignment with the other towers. Frequently, wind will also undesirably move the water supply pipe and drive towers due to the force of the wind acting thereagainst.

A brake means was disclosed in the co-pending application which truely represented a distinct improvement in the art. The brake means of this invention represents an improvement over the invention of the co-pending application.

Therefore, it is a principle object of the invention to provide a brake means for a fluid-powered sprinkler system.

A still further object of the invention is to provide a brake means for an air-powered sprinkler system which prevents the drive towers from rolling down inclines.

A further object of the invention is to provide a brake means for an air-powered sprinkler system which prevents the associated drive tower from moving unless the drive cylinder is moving through its drive stroke.

A further object of the invention is to provide a brake means for an air-powered sprinkler system which may be employed on the intermediate drive towers or on the lead drive tower of the sprinkler system.

A still further object of the invention is to provide a brake means for an air-powered sprinkler system which is economical to manufacture, durable in use and refined in appearance.

These and other objects will be apparent to those skilled in the art.

BRIEF DESCRIPTION OF THE DRAWINGS

FIG. 4 is a side view of the actuation valve associated with the brake means; and FIG. 5 is a schematic view of the circuitry of the invention.

FIG. 6 is a side view of the brake means as seen on lines 6—6 of FIG. 3.

DESCRIPTION OF THE PREFERRED EMBODIMENT

Figure 1:
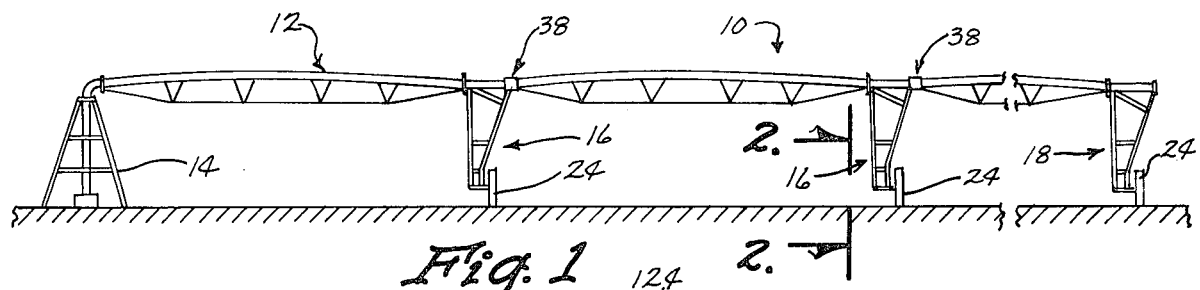
FIG. 1 is a partial side view of the sprinkler system having the brake means of this invention mounted thereon.

The numeral 10 refers generally to an air-powered sprinkler system such as generally disclosed in U.S. Pat. No. 3,606,161 which issued Sept. 20, 1971 and the air-powered sprinkler system disclosed in the patent application filed Jan. 10, 1975, Ser. No. 540,112 entitled AN AIR-POWERED SPRINKLER SYSTEM. Reliance on U.S. Pat. No. 3,606,161 and Ser. No. 540,112 is made herewith to complete this disclosure if necessary.

Sprinkling apparatus 10 generally includes a water supply pipe 12 extending outwardly from a center pivot point 14 which is in communication with a source of water under pressure. The pipe 12 is comprised of a plurality of tubular sections suitably connected together in an end-to-end relationship and supported by a plurality of intermediate towers 16 and a lead tower 18. The brake means disclosed herein is designed to be mounted on the lead tower 18 and those intermediate towers 16 which require the same. In some installations, it will not be necessary to provide a brake means on all of the intermediate towers 16.

Each of the towers 16 generally comprises a horizontally disposed frame member 20 having drive wheels 22 and 24 rotatably mounted at the opposite ends thereof as illustrated in the drawings. Wheels 22 and 24 are provided with a plurality of driving lugs 26 and 28 mounted on the periphery thereof respectively and which extend laterally therefrom.

Frame members 30 and 32 are secured at their lower ends to frame member 20 and extend upwardly therefrom in a converging relationship. Likewise, frame members 34 and 36 are secured to frame member 20 and extend upwardly therefrom in a converging relationship. The upper ends of frame members 30, 32, 34 and 36 are operatively connected to the water supply pipe for supporting the same in conventional fashion.

For purposes of description, the numeral 38 refers to a flexible joint provided on the water supply pipe 12 adjacent the tower for permitting angular movement between the tubular sections about horizontal and vertical axes. Joint 38 generally comprises a gimbal ring 40 which is pivotally connected to spaced-apart arms operatively connected to the ends of the adjacent tubular members. An alignment arm 42 is rigidly secured to the gimbal ring 40 and extends horizontally outwardly therefrom. One end of an alignment rod 44 is connected to the outer end of alignment arm 42 and is connected at its other end to an arm 46 extending from a rotary alignment cam 48 provided on the drive tower. Spring 50 normally urges the alignment cam 48 in a counter-clockwise direction as viewed in FIG. 6 and resists the clockwise rotation of the alignment cam 48. Alignment cam 48 is provided with a cam surface 52 formed in the periphery thereof having a shoulder 54 at one end thereof. The numeral 56 refers to a normally closed alignment valve having a plunger 58 extending therefrom which is adapted to be engaged by the shoulder 54 to open the alignment valve 56 upon the alignment cam 48 being sufficiently rotated. The numeral 60 refers to a safety valve which is exhaustable to the atmosphere and which has a plunger 62 extending therefrom as illustrated in FIG. 6. The outer end of the plunger 62 is provided with a roller 63 rotatably mounted thereon and which is normally received by the notch 64 formed in the periphery of alignment cam 48 and defined by shoulders 66 and 68. Safety valve 60 is normally closed but is opened to the atmosphere upon the plunger 62 being moved inwardly into the valve 60 by shoulders 66 or 68.

Figure 2:
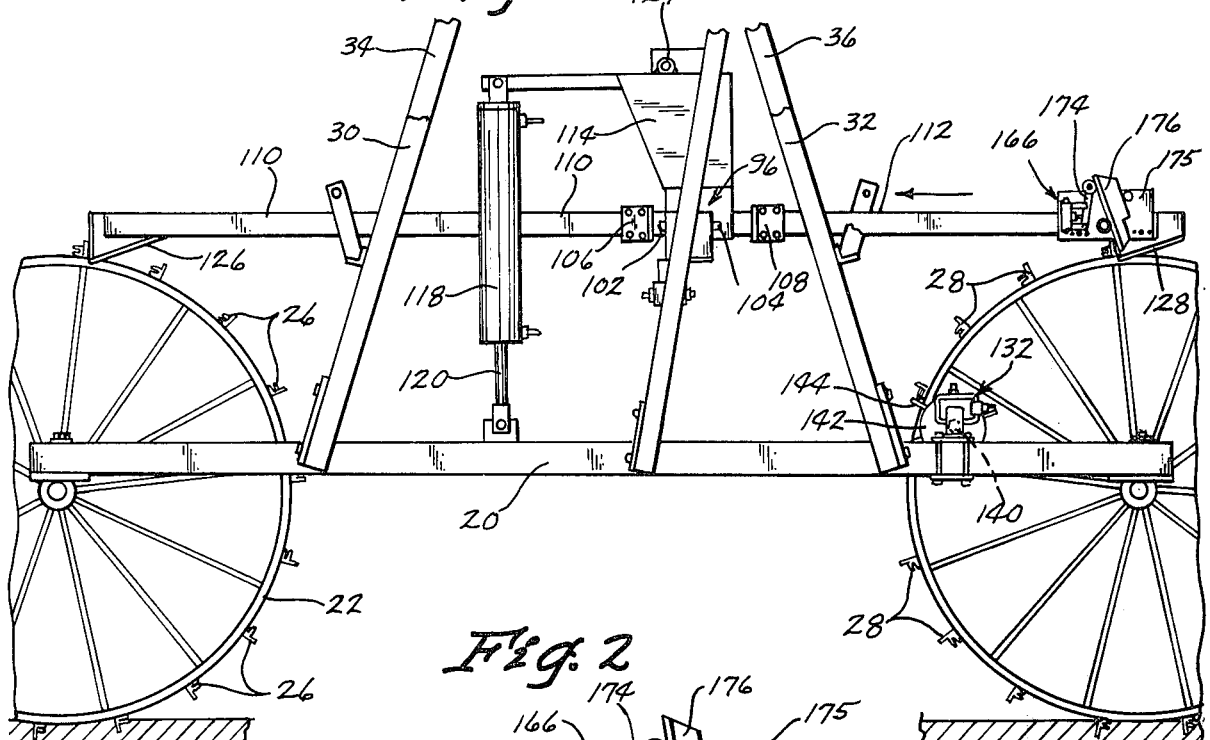
FIG. 2 is a partial side view of one of the towers of the system as seen on lines 2—2 of FIG. 1.
Figure 3:
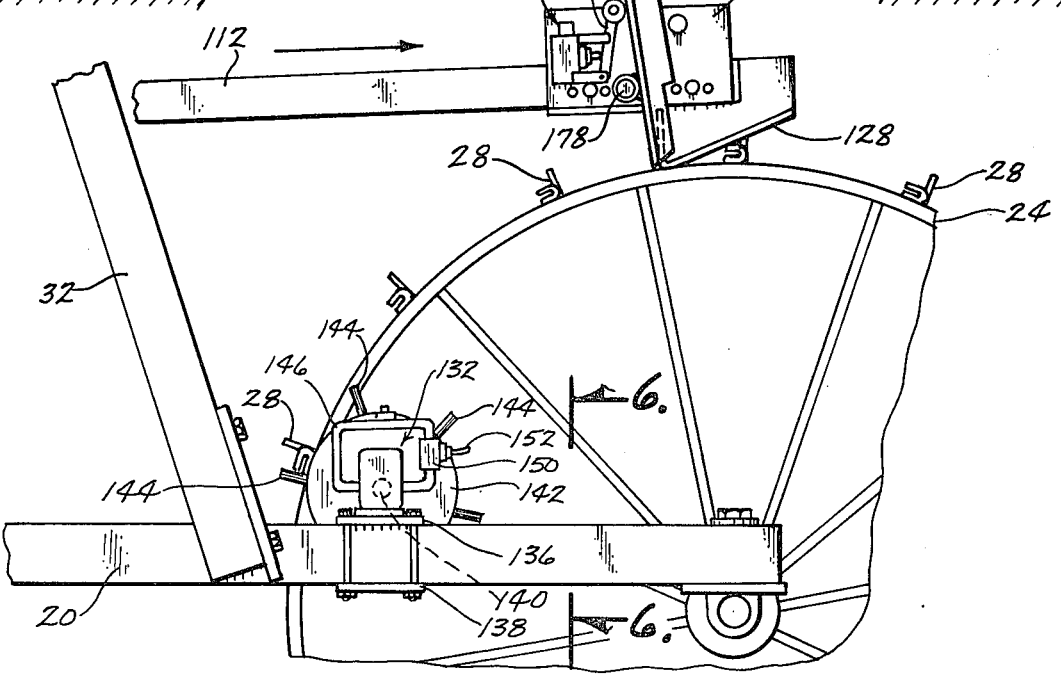
FIG. 3 is a partial side view illustrating the brake means of this invention.

The numeral 70 refers to a power source such as an electric motor or gasoline engine which is connected to an air-compressor 72 which supplies air under pressure to a surge tank 74. A high-low pressure switch 76 of conventional design is connected to the surge tank 74 and is adapted to deactivate the power source 70 if the pressure should objectionably drop within surge tank 74 or if the pressure should objectionably rise in surge tank 74. Surge tank 74 is operatively connected to a cooling apparatus 78 by line 80. The compressed air is furnished from the cooling apparatus 78 to a filter 82 through a line 84. Air line 86 extends from the filter 82 and would extend to the drive towers along the length of the sprinkling system. At each of the intermediate towers, a line 88 extends from the line 86 to a lubricator 90 mounted on the drive tower. Lubricator 90 has an air line 92 extending therefrom which is connected to the inlet side of alignment valve 56 as illustrated in FIG. 5. Line 94 connects the inlet end of safety valve 60 with the line 97 as also illustrated in FIG. 5. The numeral 96 refers to a four-way valve which is connected to line 92 by line 93. As stated, valve 96 is a four-way valve and is mounted on the drive tower so that its plungers 102 and 104 will be engaged by the brackets 106 and 108 mounted on the trojan bars 110 and 112 respectively. The inner ends of trojan bars 110 and 112 are pivotally connected to the lower end of a plate 114 which is pivotally mounted on the frame means and which has an arm 116 extending therefrom as illustrated in FIG. 2. The base end of an air cylinder 118 is pivotally connected to the outer end of arm 116 and extends downwardly therefrom towards frame member 20. The outer end of rod 120 is pivotally connected to the frame member 20 by any convenient means. Thus, actuation of the air cylinder 118 causes the plate 114 to pivot about 124 so that the trojan bars 110 and 112 are reciprocated longitudinally. Dogs 126 and 128 extend downwardly from the outer ends of trojan bars 110 and 112 respectively and are adapted to engage the lugs 26 and 28 respectively on the wheels 24 to cause wheels 22 and 24 to be rotated in a counterclockwise direction as viewed in FIG. 2 as the rod 126 is extended from the cylinder 118. The extension of the rod 120 from the cylinder 118 may be termed the drive stroke while the retraction of the rod 120 into the cylinder 118 may be referred to as the return stroke. During the return stroke, the dogs 126 and 128 simply pass over the lugs 26 and 28. The numeral 130 refers to a pivotal arm means which is adapted to engage the lugs 28 on the wheel 24 to prevent the wheel 24 from rotating in a clockwise direction as viewed in FIG. 2 during the return stroke of the cylinder 118. Thus, without some form of brake means, the drive tower would be free to move to the left as viewed in FIG. 2 if the drive tower was traveling down an incline or if sufficient wind force was being exerted on the tower from the right hand side of FIG. 2.

The brake means of this invention is referred to generally by the reference numeral 132 and generally comprises a fluid pump 134 which is mounted on the frame member 20 by brackets 136 and 138. Shaft 140 rotatably extends from pump 134 and has a brake member 142 mounted thereon. A plurality of spaced-apart fingers 144 extend radially from the periphery of brake member 142 and are adapted to be engaged or engage the lugs 28 on wheel 24.

Fluid lines 146 and 148 communicate with the inlet and outlet sides of the pump 134 and have a pilot-operated check valve 150 connected thereto. Check valve 150 has an air line 152 extending therefrom as will be described in more detail hereinafter. Check valve 150 is normally closed and would prevent fluid flowing therethrough so that the pump 134 could not rotate. With check valve 150 open, fluid can flow freely therethrough which permits the pump 160, and hence shaft 140, to freely rotate. Line 152 is connected to a three-way valve 166. Valve 166 is connected to a line 168 which is connected to line 93. Line 160 extends from valve 56 to a pilot operated valve 172. Valve 166 has a plunger 174 extending therefrom which is adapted to be engaged by the actuator arm 176 which is pivotally mounted on the trojan bar 112 so that it pivots about a horizontal axis referred to generally by the reference numeral 178. Valve 166 is normally closed but is adapted to be opened upon the lower end of the actuator arm 176 engaging the driving lug 28 on the drive wheel 24 as the trojan bar 112 is moving in its drive stroke as will be discussed in more detail hereinafter. As seen in FIG. 5, valve 96 is connected to the valve 172 by lines 180 and 182. Valve 172 is connected to the opposite ends of the air cylinder 118 by lines 184 and 186.

As previously stated, the brake means 132 illustrated in the drawings may be used on the lead tower 18 or on the intermediate towers 16. If the brake means 132 is being used on the lead tower 18, the flexible joint 38 and the alignment cam 48 and the structure associated therewith is not employed. The line 92 will simply supply system pressure to the valve 96 and the valve 166 without going through the valve 56. If the brake means 132 is being used on the lead tower 18, the valve 56 would normally be replaced by a sequence valve to prevent flow of air to the cylinder 118 until such time as the system pressure has built up to a level sufficient to power the drive units on all of the towers.

Assuming that the brake means is employed on intermediate towers, the method of operation is as follows. Power unit 70 powers the air compressor 72 which supplies compressed air to the surge tank 74 which in turn supplies the air to line 86 through the cooling apparatus and filter. Line 86 supplies air under pressure to the drive units on all of the towers.

Alignment valve 56 is normally closed but is opened by the alignment cam 48 as soon as the tower becomes out of alignment with the adjacent tower. Alignment cam 48 is opened by the alignment arm 42 causing the alignment arm 44 to rotate cam 48 in a clockwise direction as viewed in FIG. 6. When valve 56 opens, air under pressure is supplied to the valve 96 and to the valve 172. With the alignment valve 56 opened, system pressure flows to the four-way valve 96 which is situated within the drive unit so as to be controlled by the two brackets 106 and 108 which are mounted on the trojan bars 110 and 112 respectively in such a way than when cylinder 118 reaches its fully extended position, the plunger 104 will be engaged by the bracket 108 so that the valve 96 will be shifted which in turn allows the system pressure to shift the four-way valve 172 causing the cylinder 118 to return to the retracted position at which time the opposite bracket 106 engages the plunger 102 which causes the four-way valve 172 to its original position, thereby pressurizing the cylinder 118 causing the cylinder rod 120 to be extended at which time the bracket 108 again shifts the four-way valve 96 and a new cycle is commenced.

As previously stated, alignment valve 56 is normally closed but would be opened upon the tower moving out of alignment with the next adjacent tower so that the system pressure is supplied to the valve 96. Prior to valve 166 opening to permit system pressure to be supplied to the check valve 150, the pump shaft 140 cannot rotate due to the fluid within the pump circuit being prevented from circulating thereby preventing brake member 142 from rotating. Inasmuch as brake member 142 cannot rotate, the fingers 144 of the brake member 142 are in the path of the lugs 28 and will engage the same to prevent the rotation of the wheel and thus to prevent the tower from moving. As soon as system pressure is supplied to the valve 150 by the opening of the valve 166, the check valve 150 opens thereby allowing the fluid from opposite sides of the pump 134 to flow therethrough so that the shaft 140 can freely rotate. The actuator arm 176 is mounted on the plate 175 (secured to the trojan bar 112) in such a way that when the trojan bar dog presses against the lug 28 to drive the system forward, the actuator arm 176 is also engaged by the lug 28 to cause the actuator arm 176 to be rotated about axis 168 in such a manner to cause the three-way valve 166 to be open. Any time that the trojan bar dog 128 is not pressing against the wheel lug 28, such as when the drive unit would start to roll ahead or the cylinder 118 is on a return stroke, the three-way valve 166 returns to its normally closed position. When the three-way valve 166 closes, it exhausts the pressure from the pilot operator of the check valve 150 thereby allowing the check valve to return to its normally closed position and stopping the flow of fluid between lines 146 and 148. Whenever the flow of fluid is stopped through the lines 146 and 148, the rotation of the pump shaft 140 is stopped which in turn stops the rotation of the brake member 142 which through its engagement with the lugs 28 stops the rotation of the wheel 24.

If system pressure is lost, such as when the safety valve 60 shuts the system down due to misalignment or when the system is shut down by the operator, the brake member 142 engages the lugs 28 to prevent the system from rolling down a steep grade or being rolled ahead by the wind.

While the immediately foregoing description has described the system to be air-powered and that the pump 134 is of the fluid type, it should be understood that the system could be driven and operated by air, water or hydraulic fluid. Thus, it can be seen that a novel brake means has been described for use on lead and intermediate towers of a sprinkler system. The brake means of this invention prevents the system from rolling down a steep incline or from being rolled ahead by the wind to prevent damage to the system. Thus, it can be seen that the invention accomplishes at least all of its stated objectives.

I claim:

1. A self-propelled sprinkling apparatus comprising, a water supply pipe movable about a central pivot point,
a plurality of spaced-apart, wheeled drive towers supporting said supply pipe above the area to be sprinkled,
a fluid operated drive means on each of said towers to propel said towers and said supply pipe about said central pivot point,
means for supplying fluid under pressure to said drive means,
control means on said towers for controlling the operation of said drive means so that said towers will be selectively driven to maintain said supply pipe in an aligned condition as said pipe is moved about said central pivot point,
each of said drive towers comprising at least a pair of wheels, at least one of said wheels having spaced-apart drive lugs provided thereon,
a brake member rotatably mounted on at least one of said towers adjacent the said one wheel, said brake member having a plurality of fingers extending therefrom for engagement with said drive lugs so that said brake member will be rotated by said drive lugs on said one wheel when said one wheel is rotating,
a fluid pump mounted on said one tower and having a shaft rotatably extending therefrom which is operatively connected to said brake member so that rotation of said brake member causes said shaft to rotate,
said fluid pump normally preventing the rotation of said brake member thereby preventing the rotation of said one wheel,
and brake release means operatively connected to said fluid pump to permit said shaft to freely rotate when said one wheel is being driven at a predetermined rate of rotation.

2. The apparatus of claim 1 wherein said tower comprises a frame means having the said pair of wheels mounted thereon, a trojan bar means reciprocatably mounted on said frame means and moveable between first and second positions for engagement with the said drive lugs for driving said wheel when said trojan bar means moves in at least one direction, said trojan bar means including an activator means which normally engages one of said lugs when said trojan bar moves in said one direction, said drive means including means operatively connected to said trojan bar means for reciprocating said trojan bar means, said brake release means permitting said shaft to freely rotate when said activator means is in engagement with one of said lugs when said trojan bar means moves in said one direction.

3. The apparatus of claim 2 wherein a fluid conduit connects the inlet and outlet sides of said fluid pump, and a normally closed pilot operated check valve means in said fluid conduit which normally prevents fluid flow in said conduit between said inlet and outlet sides thereby preventing rotation of said shaft and brake member.

4. The apparatus of claim 3 wherein said check valve means is operatively connected to said control means whereby said check valve means will be opened and closed in response to the operation of said activator means.

* * * * *